Aug. 3, 1948. K. W. COUSE 2,446,410
COMBINATION PRY-AND-BOOM STRUCTURE
Filed Nov. 27, 1943 11 Sheets-Sheet 1
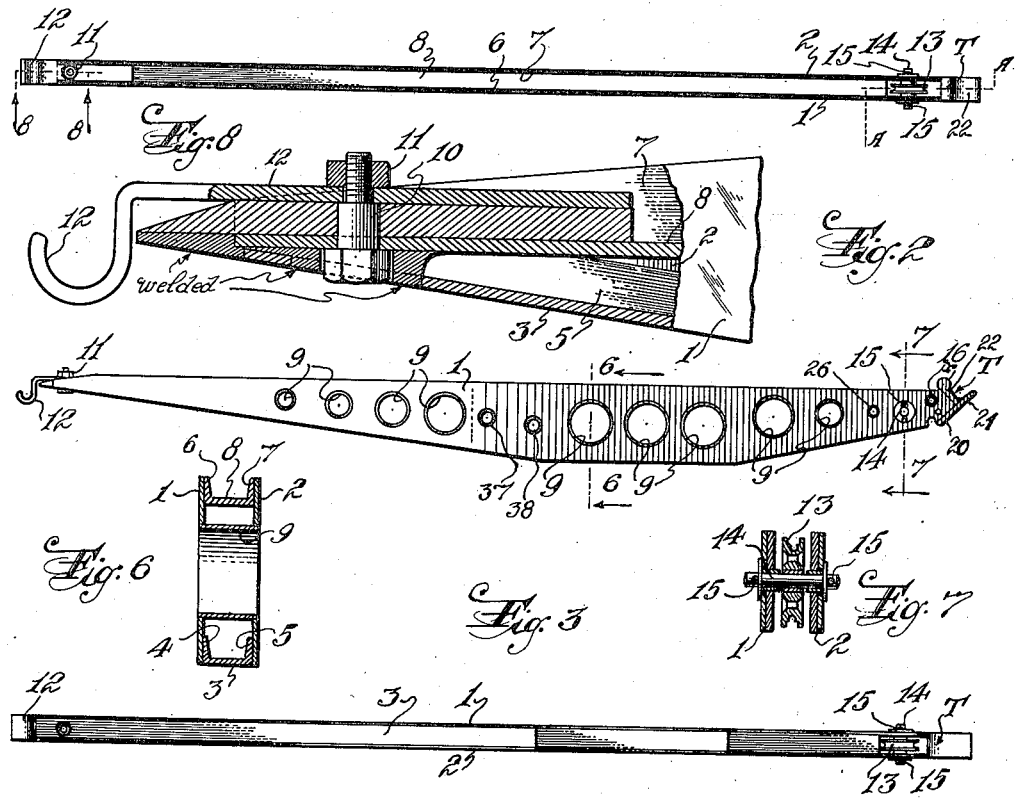
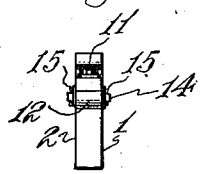
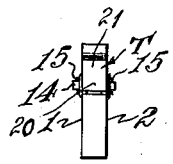
INVENTOR
Kibbey W. Couse
BY
A. D. T. Libby
ATTORNEY

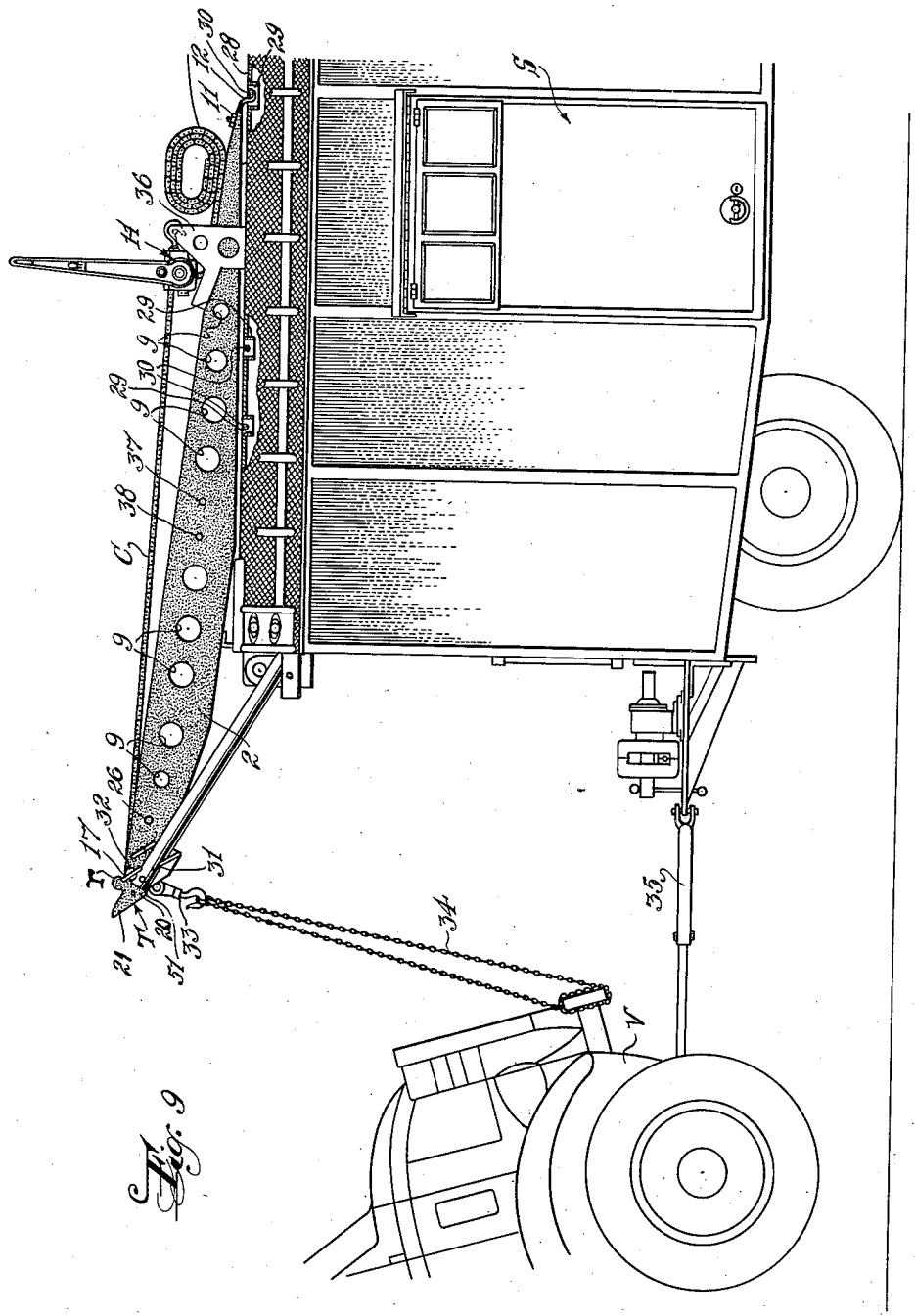

Aug. 3, 1948.  K. W. COUSE  2,446,410
COMBINATION PRY-AND-BOOM STRUCTURE
Filed Nov. 27, 1943  11 Sheets-Sheet 3
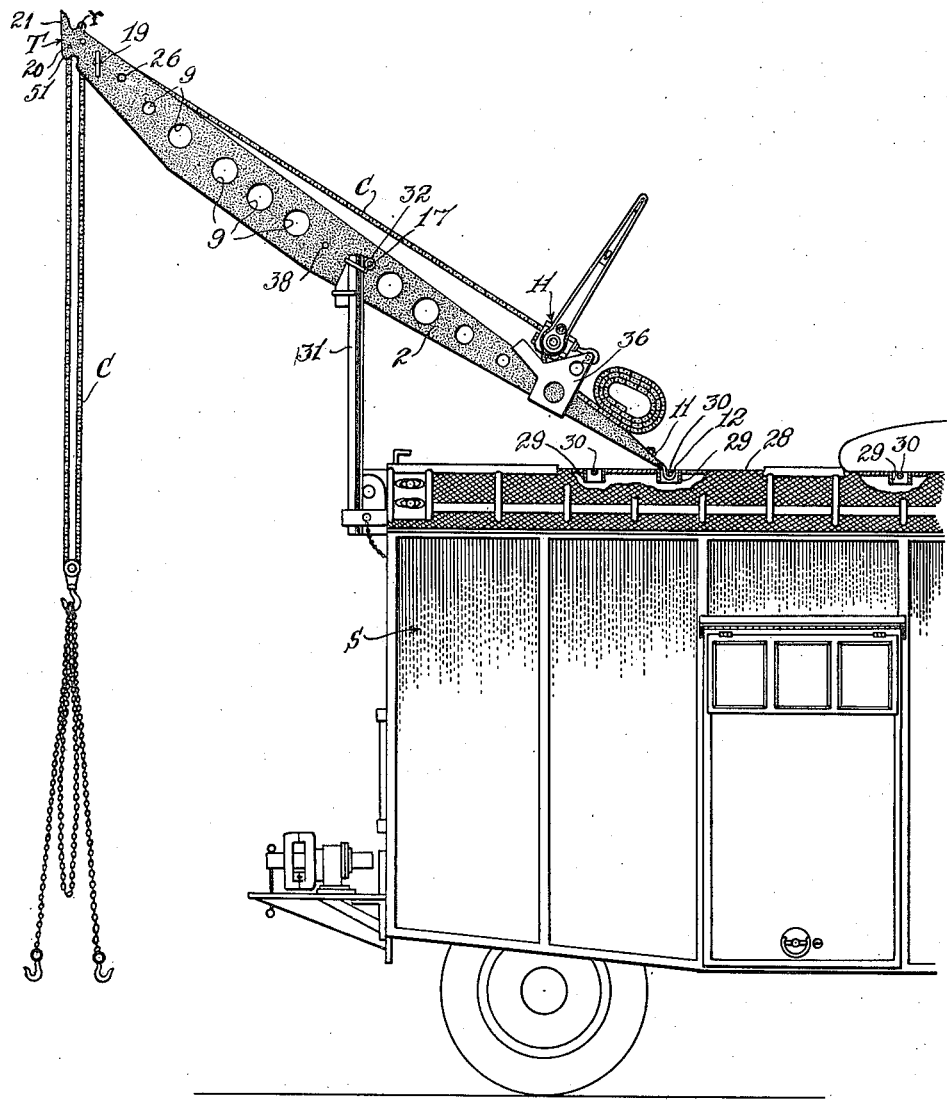
INVENTOR
Kibbey W. Couse
BY
A. D. T. Libby
ATTORNEY Aug. 3, 1948. K. W. COUSE 2,446,410
COMBINATION PRY-AND-BOOM STRUCTURE
Filed Nov. 27, 1943 11 Sheets-Sheet 4
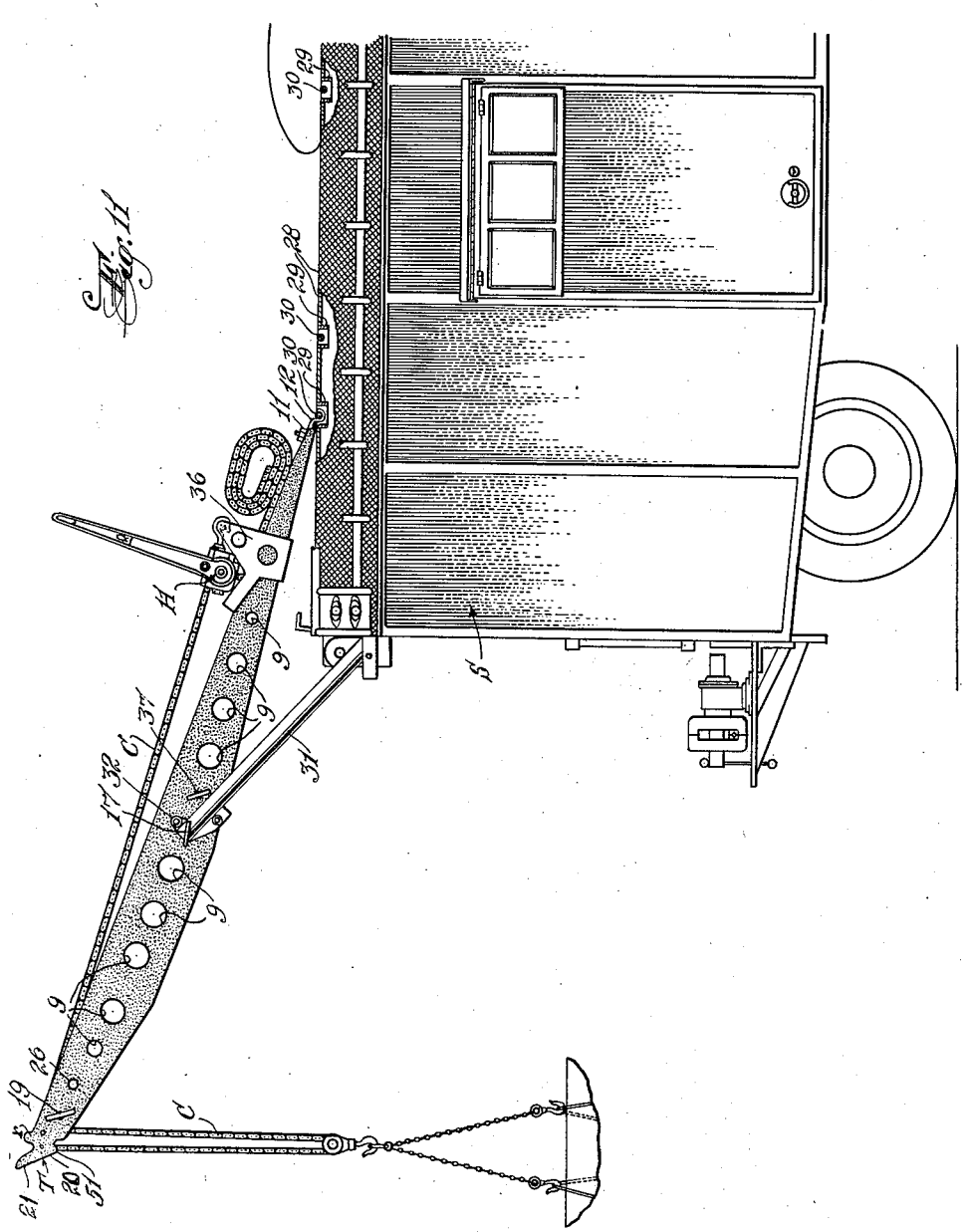
INVENTOR
Kibbey W. Couse
BY
A. D. T. Libby
ATTORNEY Aug. 3, 1948.　　　　K. W. COUSE　　　　2,446,410
COMBINATION PRY-AND-BOOM STRUCTURE
Filed Nov. 27, 1943　　　　　　　　　　11 Sheets-Sheet 5

INVENTOR
Kilbey W. Couse
BY
A. D. T. Libby
ATTORNEY

Aug. 3, 1948. K. W. COUSE 2,446,410
COMBINATION PRY-AND-BOOM STRUCTURE
Filed Nov. 27, 1943 11 Sheets-Sheet 6
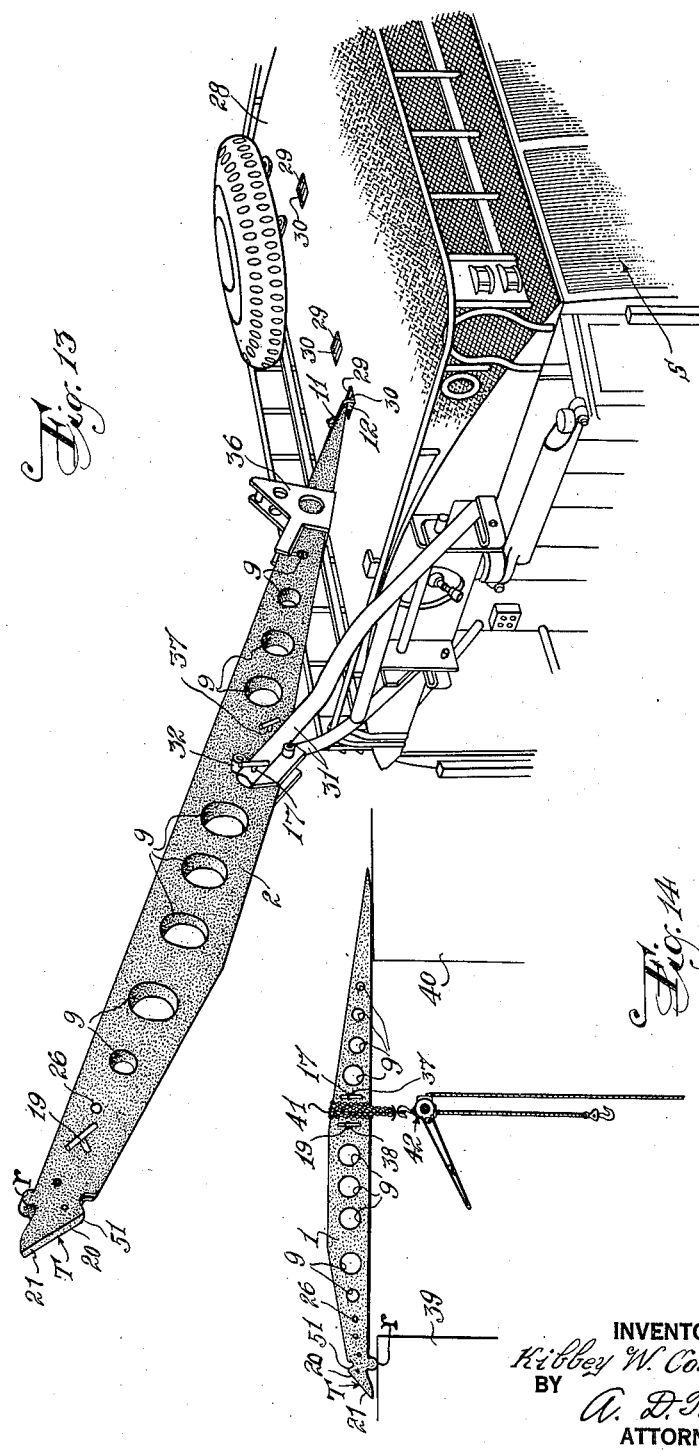
INVENTOR
*Kibbey W. Couse.*
BY
*A. D. T. Libby*
ATTORNEY Aug. 3, 1948.　　　　　K. W. COUSE　　　　　2,446,410
COMBINATION PRY-AND-BOOM STRUCTURE
Filed Nov. 27, 1943　　　　　　　　　　　　　　11 Sheets-Sheet 7
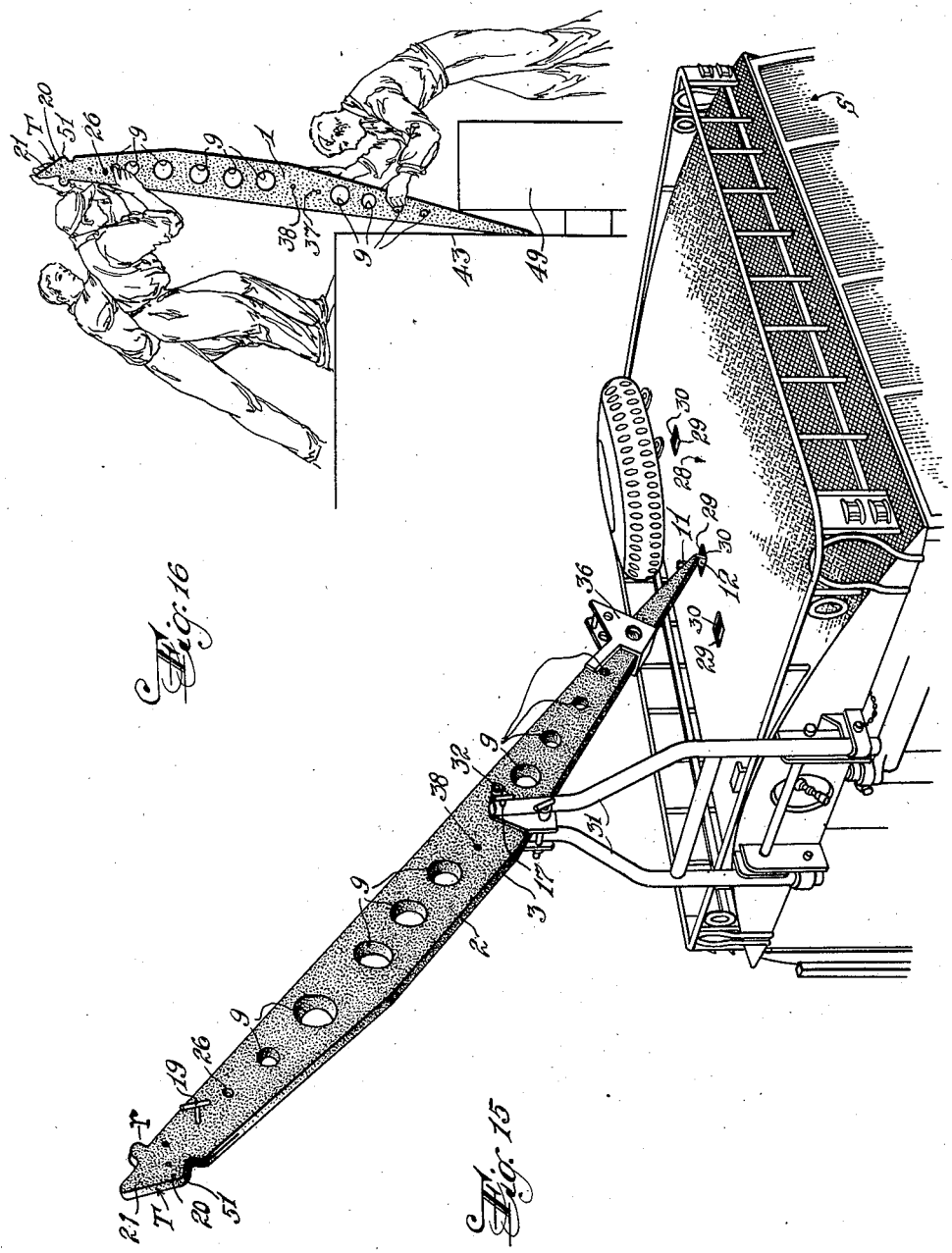
INVENTOR
*Kibbey W. Couse*
BY
*A. D. T. Libby*
ATTORNEY Aug. 3, 1948. K. W. COUSE 2,446,410
COMBINATION PRY-AND-BOOM STRUCTURE
Filed Nov. 27, 1943 11 Sheets-Sheet 8
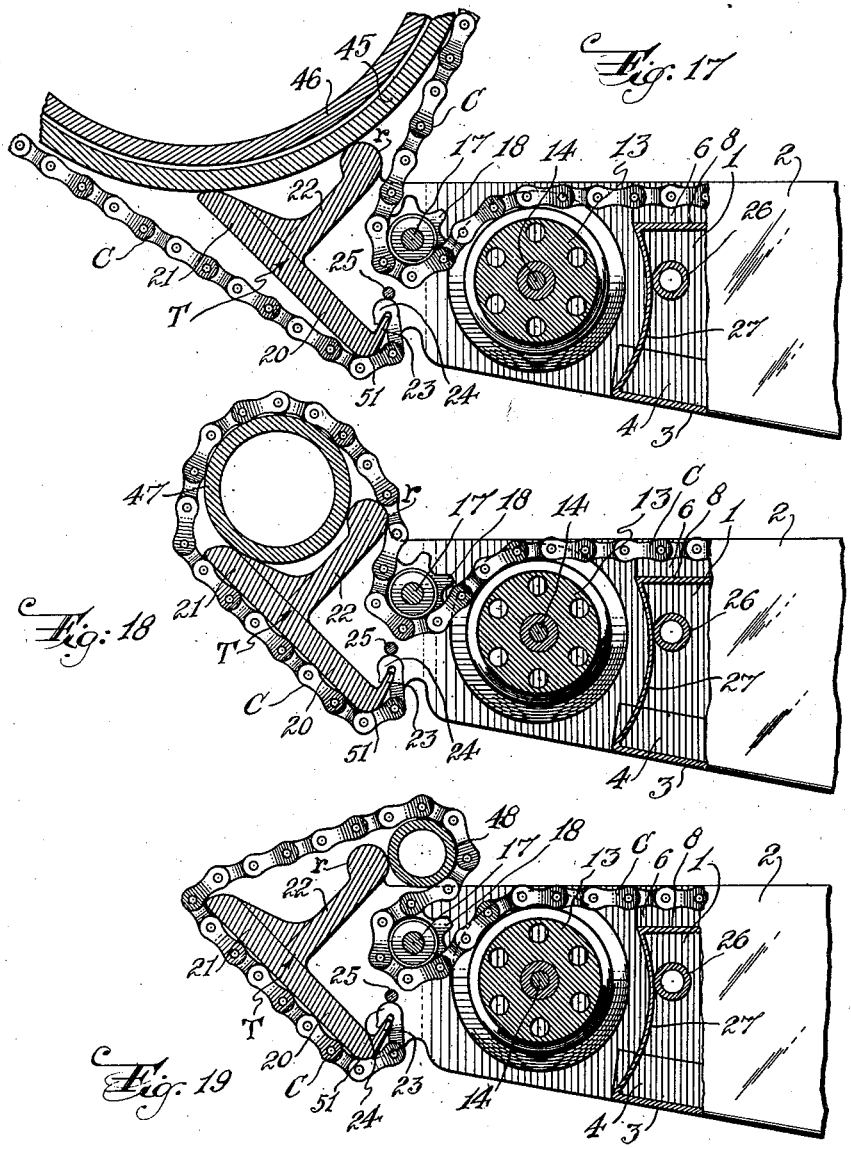
INVENTOR
Kibbey W. Couse
BY
A. D. T. Lebby
ATTORNEY

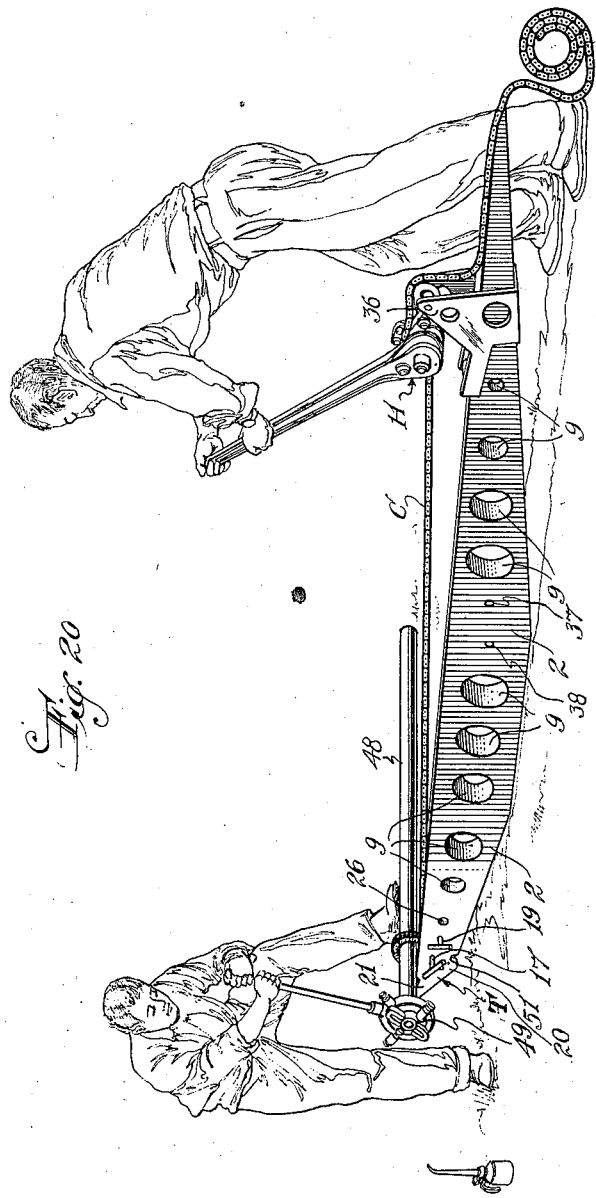

Aug. 3, 1948.　　　　K. W. COUSE　　　　2,446,410
COMBINATION PRY-AND-BOOM STRUCTURE
Filed Nov. 27, 1943　　　　　　　　　　　　　11 Sheets-Sheet 10
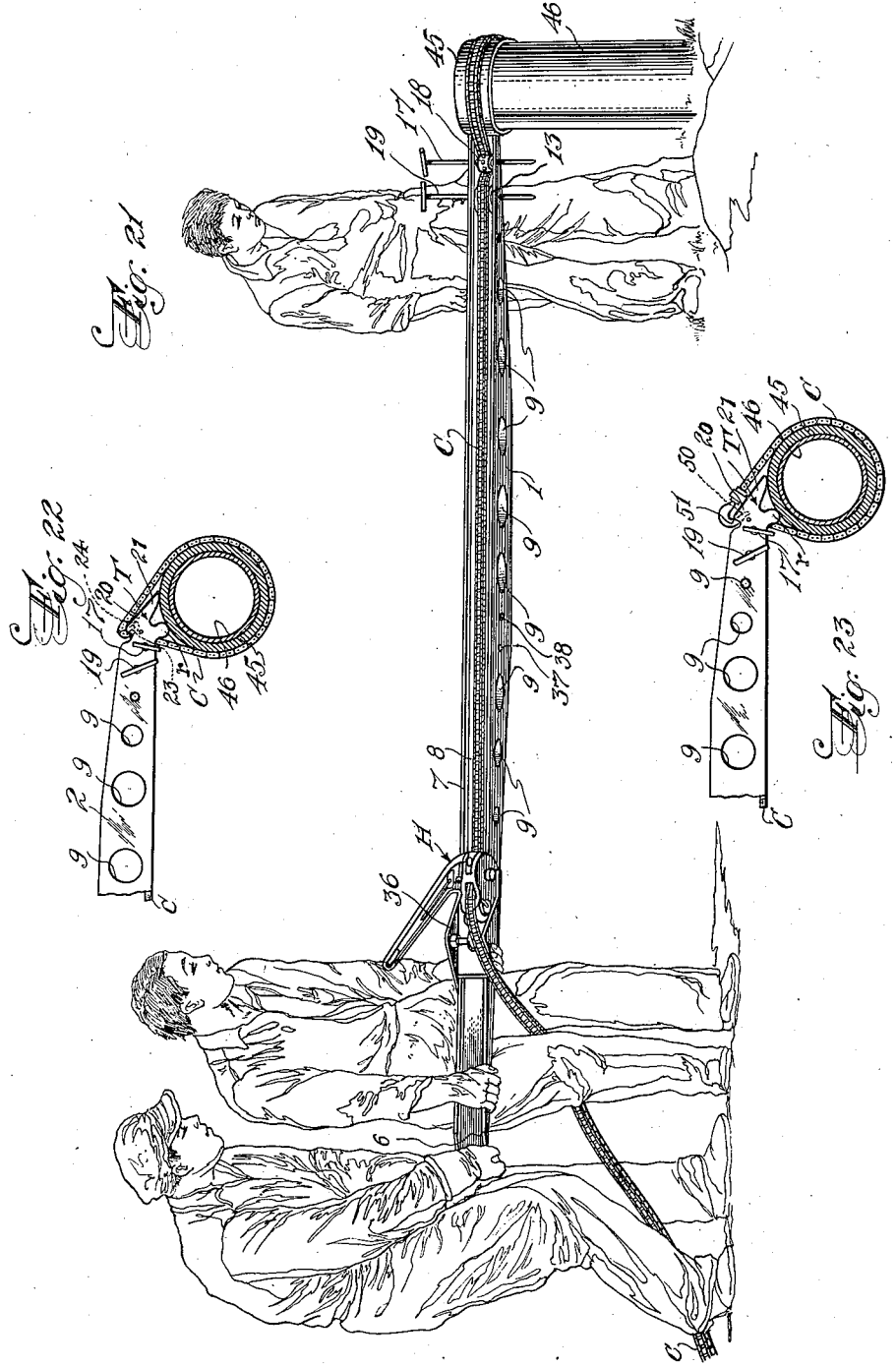
INVENTOR
Kibbey W. Couse
BY
A. D. T. Libby
ATTORNEY Aug. 3, 1948.　　　K. W. COUSE　　　2,446,410
COMBINATION PRY-AND-BOOM STRUCTURE
Filed Nov. 27, 1943　　　　　　　　11 Sheets-Sheet 11
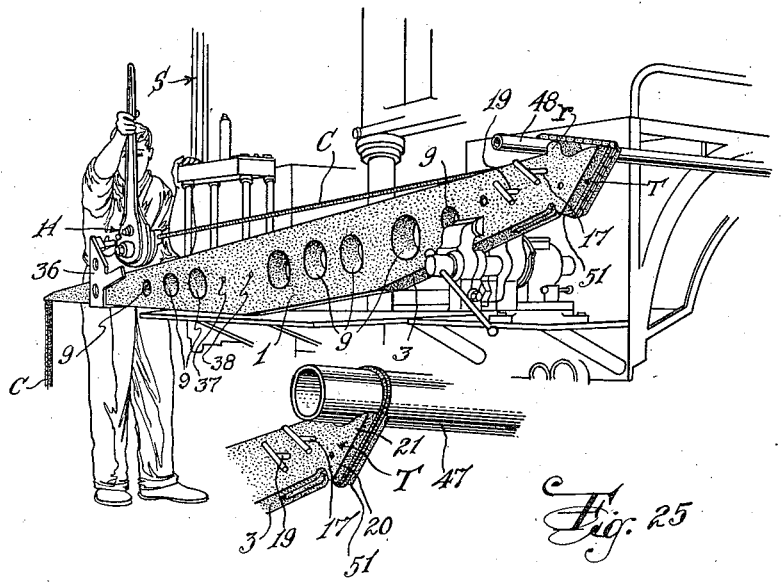
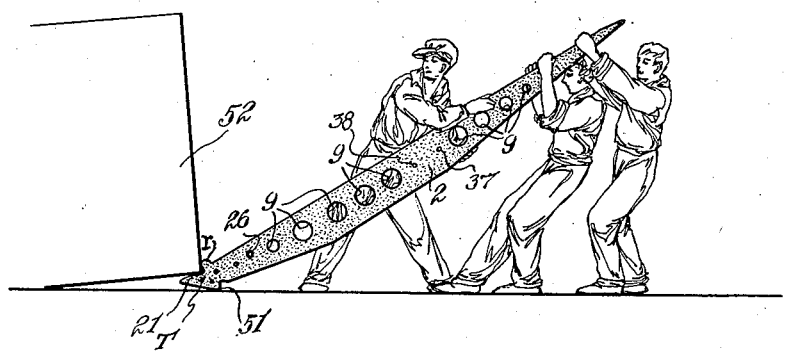
INVENTOR
Kibbey W. Couse
BY
A. D. T. Libby
ATTORNEY Patented Aug. 3, 1948

2,446,410

UNITED STATES PATENT OFFICE 2,446,410

COMBINATION PRY-AND-BOOM STRUCTURE

Kibbey W. Couse, Newark, N. J.

Application November 27, 1943, Serial No. 511,921

3 Claims. (Cl. 7—12)

This invention relates to a structure which has numerous uses both as a pry and as a boom, and is especially adapted for use in connection with portable or traveling machine shops of the type shown in my Design Patent No. D. 109,942, issued May 31, 1938.

It happens many times in construction work of various kinds, particularly in army field work, that a heavy pry structure as well as a boom structure is a highly advantageous piece of apparatus, and it is therefore the principal object of my invention to provide a substantial structure which can be used under various and sundry conditions as a pry and as a boom.

The invention and numerous of its uses is shown in the attached drawings wherein:

Figure 1 is a top plan view of the structure.

Figure 2 is a side elevation of Figure 1.

Figure 3 is a bottom view of Figure 1.

Figure 4 is a left-hand end view of the structure shown in Figure 1.

Figure 5 is a right-hand end view of Figure 1.

Figure 6 is a view on the line 6—6 of Figure 2.

Figure 7 is a view on the line 7—7 of Figure 2.

Figure 8 is an enlarged view on the line 8—8 of Figure 1.

Figure 9 is a view of the pry-boom structure used in connection with one form of my traveling machine shop and illustrating one of the uses to which the structure may be put.

Figure 10 is a view similar to Figure 9 but showing the pry-boom in its most elevated working condition.

Figure 11 is a view similar to Figure 10 but with the pry-boom in approximately one-half its extreme elevated position and in a new position with respect to the shop or vehicle.

Figure 13 is a view similar to Figure 11 without the hoist chain and tackle at the free end.

Figure 14 shows the structure when used as a boom independently of the portable shop, and used as a bridge between two support members.

Figure 15 is a view similar to Figure 10, but without all of the hoisting apparatus.

Figure 16 shows the structure when used as a pry.

Figure 17 is a side view, partly in elevation and partly in section showing an enlargement of the structure when used to loosen or tighten a pipe cap or a pipe of large outside diameter. This figure should be taken in connection with Figure 21 which shows the structure in use.

Figure 18 is similar to Figure 17, but shows the method of holding a pipe of smaller diameter for performing operations on the pipe. This figure should be taken in connection with Figure 25.

Figure 19 is a view similar to Figure 17, showing the method of holding a still smaller pipe for the purpose of doing operations thereon, such as turning a thread as illustrated in Figure 20 which should be considered in connection with Figure 19.

Fig. 20 shows the device used for holding a comparatively small pipe that is being threaded.

Fig. 21 shows the device used for turning a pipe cap of large diameter.

Figure 22 shows, more in detail, how the pipe cap of Figures 17 and 21 is gripped by the hoist or pull chain.

Figure 23 is a view similar to Figure 22 but showing a slightly modified form of attaching one end of the chain to the pry-boom.

Figure 24 shows the structure having one end mounted in a vise on the traveling shop, and the opposite end resting on part of the shop structure.

Fig. 25 is a perspective view of a pipe being held as shown in section in Fig. 18.

Figure 26 shows the structure when used as a pry whereby a tremendous leverage is obtained.

Figure 12:
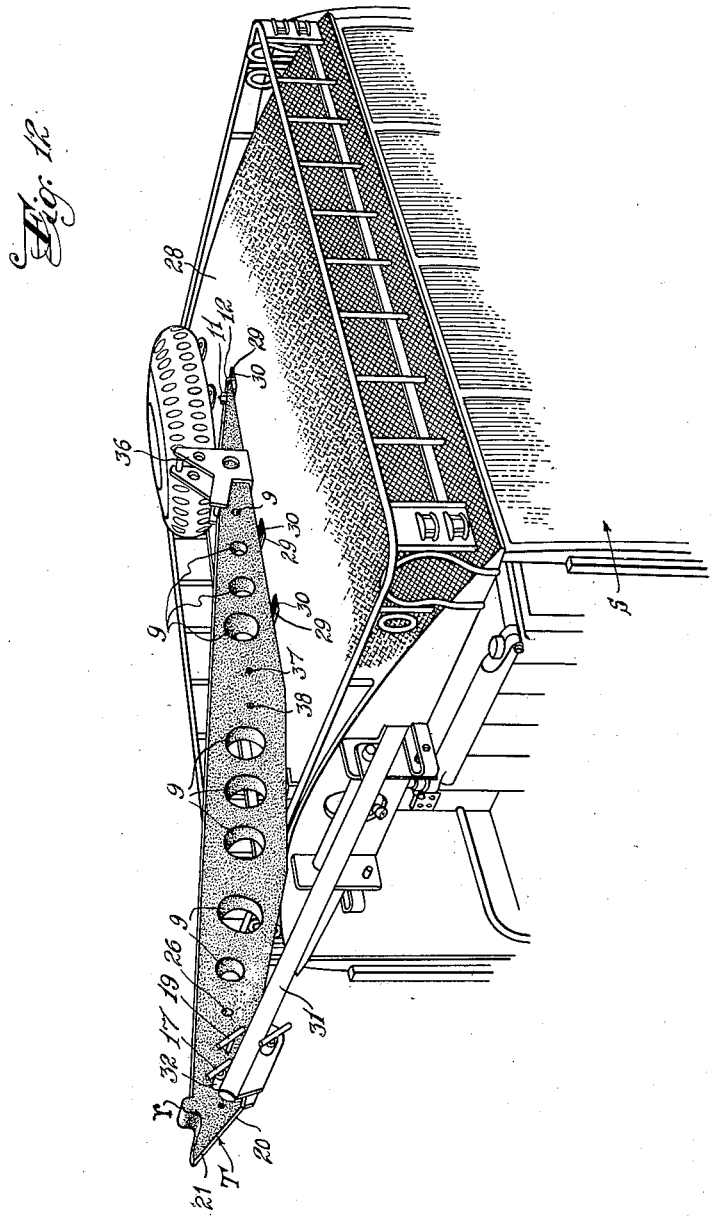
Figure 12 is a view similar to Figure 9 but with the structure folded up in its traveling position.

In the various views, wherein like numbers refer to corresponding parts, 1 and 2 are stiff metal side plates, preferably of steel or an alloy thereof to prevent rusting, which are shaped generally as shown in Figure 2. Extending along the bottom part of the plates is a channel iron, the web 3 of which comes substantially flush with the edges of the plates 1 and 2, while the flanges 4 and 5 extend inwardly toward the center of the structure. Positioned along the top of the structure is another channel whose flanges 6 and 7 come substantially flush with the upper edges of the plates 1 and 2, while the web 8 is below these edges and serves as a guide and runway for a hoist or pull chain to which reference will be later made.

Extending transversely of the plates between the channel irons, are a plurality of stub or short pieces of pipe 9 which serve to stiffen the structure as well as to reduce its weight. These pipes also serve as openings through which bars may be inserted so that the structure may be more easily carried by man-power to which reference will be later made. The plates 1 and 2, the two channels and the pipes 9 are all fastened together as by welding to form a rigid structure.

One end of the structure, for instance the left-hand end as shown in the drawing, has a relatively long taper and the end portions are welded together as indicated in Figure 8. A hole is provided near the extremity to receive a screw-stud 10 to which a nut 11 is attached for fastening a hook 12 into position. On the opposite end of the structure, which is also somewhat tapered, there is mounted a guide wheel 13 on a pin 14. Preferably, the pin 14 is held in place by cotter pins 15 whereby the guide wheel 13 may be readily removed. A bushed hole 16 is provided to receive a pin 17 for supporting a sprocket wheel 18 which serves in the nature of an idler or take-up device. In some cases, the guide wheel 13 may also be anchored on a pin 19 as illustrated in Figure 21.

Fastened to this extremity of the structure, as by welding, is a T member having arms 20 and 21 and a stem 22 terminating in a rounded edge r which is of much importance when the structure is used as a pipe-wrench as will be seen from the drawings. As shown in Figures 17, 18 and 19, the arm 20 has an edge or ledge 23 for receiving a hook 24 of the hoist chain or pull member C. A stud or pin 25, which may be similar to 17, is used to hold the hook 24 in position on the ledge 23. Closely adjacent the guide wheel 13 and welded to the plates 1 and 2, is a pipe stud 26 similar to the stud pipes 9. A curved member 27 is welded between the webs 3 and 8 of the two channels and the two side plates 1 and 2 adjacent the guide wheel 13.

The structure just described is of considerable length on the order of ten feet, and weight on the order of approximately one hundred fifty pounds, as it must be to serve the purpose which will now be described.

In Figure 9, it will be seen that the shop S, only the rear end of which is shown, has a rigid metal member 28 anchored in the top portion thereof, and along the member 28 are a plurality of pockets or recesses 29 across which are anchored pins 30 to receive the hook 12, thereby anchoring the pry-boom at this end to the shop. To the other extremity of the pry-boom is attached a brace member 31 as by means of a pin such as 17 which passes through a member 32, forming part of the end brace 31. This pin 17 also carries the sprocket member 18 (Figures 17 to 19), over which the chain C operates, the end of the chain terminating in a hook 33 to which is fastened a chain 34 shown attached to the front of a vehicle V which is in trouble. An extension bar 35 is also shown attached to the rear of the shop and to the bumper or axle of the vehicle V, the front wheels of which are lifted up by the chain C acting through the hoist structure H. The hoist structure H has a frame member 36 which is adapted to be slid over the long tapered end of the pry-boom and is fitted thereto so that strain applied to the hoist simply draws the frame member 36 into tighter engagement with the pry-boom.

In Figure 10 the hook 12 of the pry-boom is anchored in a different position on the member 28, while the brace member 31 is positioned by a pin 17 in a transverse hole 37 (Figure 9), between the plates 1 and 2, and which hole may be reenforced by a pipe of small diameter.

Figure 11 shows the hook 12 in still another position on the member 28 and with the brace 31 fastened by a pin 17 in a hole 38 (Figure 9) which is similarly formed as the hole 37.

In Figure 14 the structure is shown as a boom between some support members 39 and 40 wherein the chain 41 for holding the tackle 42 is raised around the structure and held in longitudinal position by pins 17.

In Figure 16 the structure is shown as a pry between the parts 43 and 44. As illustrated in this figure, three men are shown in the operation of the structure as the structure is of considerable length and weight and requires a plurality of men to handle it when used as shown in Figure 16.

In Figure 21 the structure is shown as applied to a pipe cap 45 on a large-diameter pipe 46, or it may be applied directly to the pipe 46 or to some other structure of large diameter which it is desired to turn. As shown in Figure 17, the pipe 46 rests on the arm 21 and the rounded edge r of the stem 22 of the T member on the end of the structure, while the chain C passes over the guide pulley 13 and the idler sprocket wheel 18 into secure gripping relation with the cap 45. Thus the T member acts as a guide support for the cap or pipe, whereby when the hoist member H is drawn up, the cap or pipe or other structure being operated on is gripped securely and a tremendous leverage can be applied thereto; in fact, a sizable tree can be twisted out of the ground by this structure.

In Figure 18, taken in connection with Figure 25, a pipe 47 of smaller diameter than that shown in Figure 17 is being operated on but the method of operation is the same.

In Figures 19 and 20 a still smaller pipe 48 is being operated on. In this case, the pipe 48 is positioned against the end of the stem 22 of the T fitting and the upper part of the structure. As shown in Figure 20, the free end of the pipe 48 may rest on the ground or some other suitable support while a screw-thread cutting device 49 is applied to the pipe.

In Figure 23, the ledge member 23 (see Figure 17) is omitted and a recess is formed in the end of the T fitting to receive the end 50 of a chain hook. Otherwise, the construction is the same as in Figure 22.

It will be noted that in some cases where the pull-chain C may be operated without the hoist member H as shown, the upper channel serves as a guide and support member for the chain, and even when the hoist is used, it acts as a guide and support for the chain at least at one end of the structure.

In Figure 26, the structure is used as a pry wherein the end 51 of the T formation on the end of the structure acts as a fulcrum while the arm 20 acts as a lifting member to lift some heavy structure 52. With this arrangement, an enormous leverage may be exerted and an exceedingly heavy weight may be lifted.

While I have shown several applications of my structure, it will be apparent that there are numerous others to which the same may be applied, without departing from the spirit of the invention or the scope of the appended claims.

What I claim is:

1. A boom structure comprising a pair of elongated sheet-metal side plates, a pair of channel irons positioned between the plates, one along the top edges and the other along the bottom edges of the plates, the bottom channel having its flanges projecting inwardly with its web coming substantially flush with the bottom edges of the side plates, the top channel having its flanges projecting outwardly and coming substantially flush with the top edges of the side plates, the side plates having registering holes therein intermediate their ends, spacer stub pipes positioned in said holes transversely between said plates, the plates, channels and pipes all being welded together, one end of the above-defined structure being tapered, a removable hook fastened thereto to serve as one end of a boom, the opposite end of the structure being also tapered and having fittings thereon to cooperate with a hoist and/or grip chain, a portion of said top channel forming a guide for said chain.

2. The combination of an automotive vehicle and a pry-boom structure as herein defined having a long tapered end having a hook detachably fastened thereto; the vehicle roof having a strong, rigid member anchored thereto, said member having along the length of the roof a plurality of anchoring devices to receive and hold the hook on the tapered end of the pry-boom, a brace member having one end attached to the rear extremity of the roof for arcuate movement thereon, while its opposite end is adapted to be fastened to the pry-boom at its free end or to some place intermediate its ends, and a hoisting apparatus slidably fitting on the tapered end of the pry-boom structure, the hoisting apparatus including a chain which extends longitudinally of said structure and over a pulley at the free end of the structure for cooperation with attachment devices for lifting or gripping an object, whereby said structure acts as a boom, the hoisting apparatus and hook being readily removable from said structure whereby the structure can be used as a pry at either end.

3. A structure comprising a pair of elongated sheet-metal side plates, top and bottom longitudinal and transverse spacing members for said plates, all being welded together, one end of the above defined structure being tapered and also having a hook adapted to be fastened thereto to serve as the anchoring end of the structure, the opposite end of the structure being also tapered and having fittings thereon to cooperate with a hoist and/or grip chain, the top longitudinal member being a channel iron positioned with the channel open so it may act as a guide and support for the chain member and said transverse members consisting of short sections of pipe.

KIBBEY W. COUSE.

REFERENCES CITED

The following references are of record in the file of this patent:

UNITED STATES PATENTS

| Number | Name | Date |
|---|---|---|
| 551,399 | Newell | Dec. 17, 1895 |
| 585,123 | Severance | June 22, 1897 |
| 790,478 | Byron | May 23, 1905 |
| 917,879 | Linn | Apr. 13, 1909 |
| 1,245,062 | Stuewe | Oct. 30, 1917 |
| 1,528,642 | Voorhies et al. | Mar. 3, 1925 |
| 1,571,240 | Dornier | Feb. 2, 1926 |
| 1,890,227 | McKee | Dec. 6, 1932 |
| 2,129,624 | Rafter | Sept. 6, 1938 |
| 2,333,136 | Wolford | Nov. 2, 1943 |